(12) United States Patent
Kawakita et al.

(10) Patent No.: US 10,713,343 B2
(45) Date of Patent: Jul. 14, 2020

(54) METHODS, DEVICES AND SYSTEMS FOR AUTHENTICATED ACCESS TO ELECTRONIC DEVICE IN A CLOSED CONFIGURATION

(71) Applicant: LENOVO (SINGAPORE) PTE. LTD., Singapore (SG)

(72) Inventors: Koji Kawakita, Yokohama (JP); Yasumichi Tsukamoto, Yokohama (JP); Michael William Stuart Ripp, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 212 days.

(21) Appl. No.: 15/976,804

(22) Filed: May 10, 2018

(65) Prior Publication Data
US 2019/0347389 A1 Nov. 14, 2019

(51) Int. Cl.
*G06F 21/32* (2013.01)
*G06F 1/16* (2006.01)
*G06F 3/16* (2006.01)
*G06F 3/0488* (2013.01)

(52) U.S. Cl.
CPC ............ *G06F 21/32* (2013.01); *G06F 1/169* (2013.01); *G06F 1/1662* (2013.01); *G06F 3/0488* (2013.01); *G06F 3/167* (2013.01)

(58) Field of Classification Search
CPC ...... G06F 21/32; G06F 1/1662; G06F 3/0488; G06F 3/167; G06F 1/169
See application file for complete search history.

(56) References Cited

U.S. PATENT DOCUMENTS

| | | | | |
|---|---|---|---|---|
| 8,819,277 | B2 * | 8/2014 | Glowacki | H04L 12/1895 709/203 |
| 10,304,463 | B2 * | 5/2019 | Mixter | G10L 15/08 |
| 10,372,398 | B2 * | 8/2019 | Jeune | G06F 3/044 |
| 10,389,733 | B2 * | 8/2019 | Fasoli | H04L 63/166 |
| 10,395,128 | B2 * | 8/2019 | Van Os | G06K 9/00255 |
| 10,401,490 | B2 * | 9/2019 | Gillian | G01S 13/867 |
| 10,558,546 | B2 * | 2/2020 | Cranfill | G06F 11/3423 |
| 10,574,735 | B2 * | 2/2020 | Carlos | H04L 67/142 |
| 2010/0245082 | A1 * | 9/2010 | Stewart | G06F 21/32 340/540 |
| 2010/0332236 | A1 * | 12/2010 | Tan | G10L 15/26 704/275 |
| 2014/0162598 | A1 * | 6/2014 | Villa-Real | G06Q 20/4014 455/411 |
| 2018/0218212 | A1 * | 8/2018 | Yoshikawa | G06K 9/0061 |
| 2018/0247065 | A1 * | 8/2018 | Rhee | G07C 9/257 |
| 2019/0172457 | A1 * | 6/2019 | Cheng | G06F 3/167 |

* cited by examiner

*Primary Examiner* — Oleg Korsak
*Assistant Examiner* — Feliciano S Mejia
(74) *Attorney, Agent, or Firm* — Shimokaji IP

(57) ABSTRACT

Devices, systems and methods for enabling voice access to a portable electronic device in a closed physical configuration with biometric authentication are disclosed. A device can have multiple physical configurations, including a closed configuration in which a display and/or user interface is not accessible. A biometric sensor disposed on an outer surface of the device in at least the closed configuration can be used to enable access to the device or secure functions of the device, via a voice engine or the like, even though the device is physically closed. In some embodiments, unsecure functions can be accessed via voice engine without use of the biometric sensor when the device is closed.

19 Claims, 12 Drawing Sheets

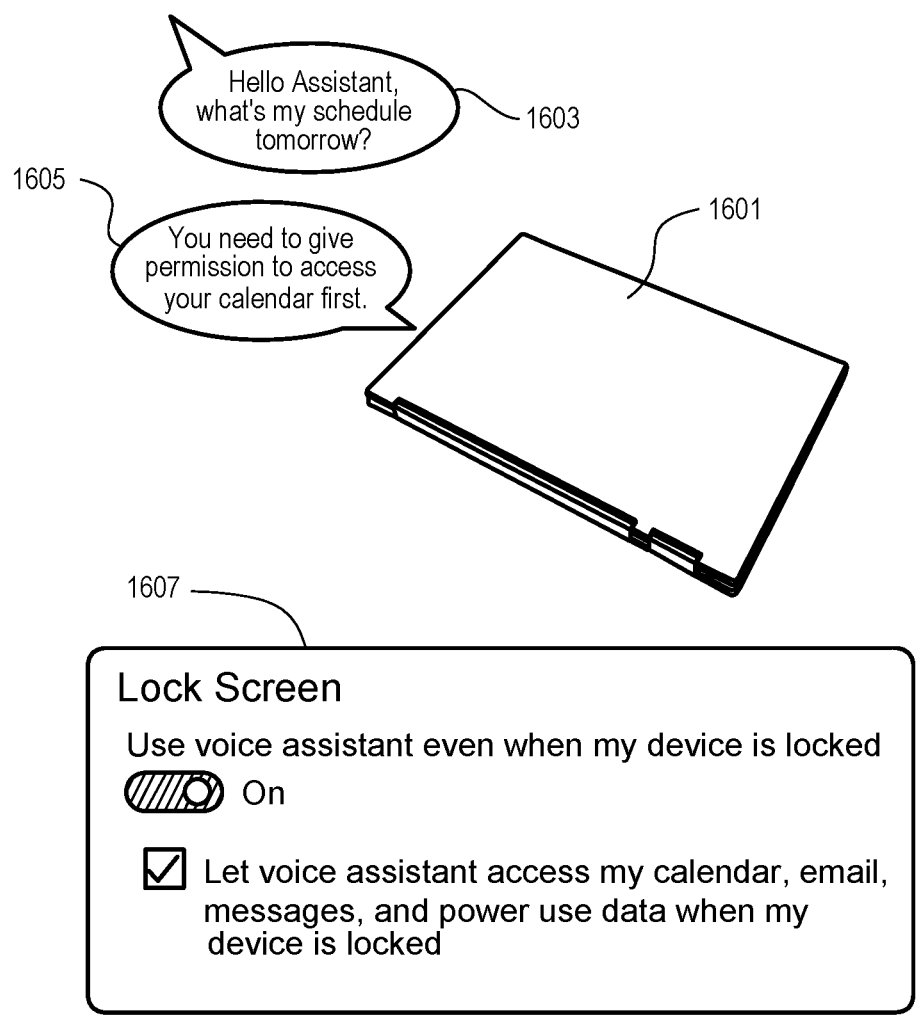
FIG. 16 (BACKGROUND)

METHODS, DEVICES AND SYSTEMS FOR AUTHENTICATED ACCESS TO ELECTRONIC DEVICE IN A CLOSED CONFIGURATION

BACKGROUND OF THE INVENTION

The present invention generally relates to portable electronic devices, and, more particularly, to portable electronic devices having a physically closed configuration in which a display and/or physical human interface is accessible by a user.

Portable computing devices, such as laptops and/or tablets, can be closed when not in use (a lid-closed state), to turn the devices off or place them in a lower power state (i.e., sleep, standby). When in the lid-closed state, the display and keyboard of the device are not accessible by a user.

To enable access to a laptop in the lid-closed state, some conventional systems are equipped with voice recognition software that is enabled in the lid-closed state. In such conventional systems, even if the system is in a sleep state, "wake on voice" technology, using an audio digital signal processor (DSP), can wake the system with a voice trigger. Voice commands of the user can then be processed by the system for particular applications. For example, while the laptop is in the lid-closed state, the user can wake the laptop with a voice trigger, and then ask it "What's the schedule today?" The laptop can then access calendar entries for the present day and give an audio response.

While such voice access technology can provide a needed and convenient service to a user, current approaches are not without drawbacks.

FIG. 16 is a diagram showing conventional voice recognition operations for laptop computer. FIG. 16 shows a conventional laptop computer 1601 with wake on voice technology. Upon receiving a voice trigger and request 1603, conventional laptop computer 1601 can wake from a sleep state and attempt to execute the request. However, an operating system installed on the conventional laptop computer 1601 can have privacy protections for private data stored on the device. Thus, if a user request requires the use of protected private data, the conventional laptop computer 1601 may prevent the request and notify the user that permissions must first be enabled 1605 in order for the request to be processed.

Referring still to FIG. 16, an operating system of conventional laptop computer 1601 can enable a user to set private data permissions for voice access via a lock screen 1607. However, once such permissions are enabled, private data on the conventional laptop computer 1601 is accessible via a user voice. This lessens the security of the private data and can even result in the inadvertent disclosure of private data by unintended speech or sounds.

As can be seen, there is a need for apparatus and methods to provide means for accessing the functions of a closed device, while at the same time ensuring private data on the device remains secure.

SUMMARY OF THE INVENTION

In one aspect of the present invention, a portable electronic device can comprise a display; a body having: a first physical configuration in which the display is not fully accessible by a user, and a second physical configuration in which the display is fully accessible by the user; an authentication system having a biometric sensor on an outer surface of the device that is user accessible in the first physical configuration; and a voice engine enabled to access functions of the device, wherein the voice engine enables access to predetermined secure functions in response to a successful biometric authentication of a user by the authentication system, and the voice engine prevents access to the predetermined secure functions of the device absent successful biometric authentication of the user by the authentication system.

In another aspect of the present invention, a portable electronic device can comprise: a body configurable into at least: a closed state in which a physical user interface is not accessible by a user, and an open state in which the physical user interface is accessible by the user; a main computing system having functions that can be unlocked in response to at least a biometric authentication operation; and a biometric authentication system having at least one biometric sensor accessible when the device is in at least the closed configuration; wherein the biometric authentication system is configured to execute the biometric authentication operation independent of the main computing system.

In a further aspect of the present invention, a computer implemented method having a processor and memory can comprise: while a portable electronic device is closed to prevent access to a display of the portable electronic device by a user of the portable electronic device, authenticating the user with a biometric sensor disposed on an outer surface of the portable electronic device when closed; in response to a successful authentication of the user with the biometric sensor, enabling a voice engine to access at least one secure function of the portable electronic device when closed; and absent successful authentication of the user with the biometric sensor, preventing the voice engine from accessing the at least one secure function.

These and other features, aspects and advantages of the present invention will become better understood with reference to the following drawings, description and claims.

BRIEF DESCRIPTION OF THE DRAWINGS

FIG. 16 is a diagram showing a conventional laptop computing device and conventional voice access operations.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Various inventive features are described below that can each be used independently of one another or in combination with other features.

Broadly, this invention provides a portable electronic device that can enable secure access via voice command when the device is physically closed. By using biometric authentication to enable voice access, a user can initiate voice requests to the device securely, including the access of private data. When voice access has ended, the device can return to a secured state, preventing access without biometric re-authentication. In very particular embodiments, a user can access secure data and/or applications with a voice engine present in a personal computing device (e.g., laptop, tablet), while the device is in a closed configuration (e.g., lid-closed state).

Figure 1A:
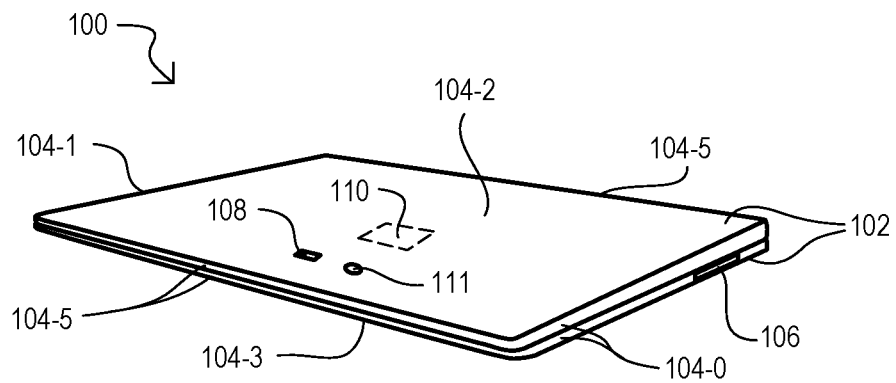
FIGS. 1A and 1B are perspective views of a portable electronic device according to an embodiment of the present invention.
Figure 1B:
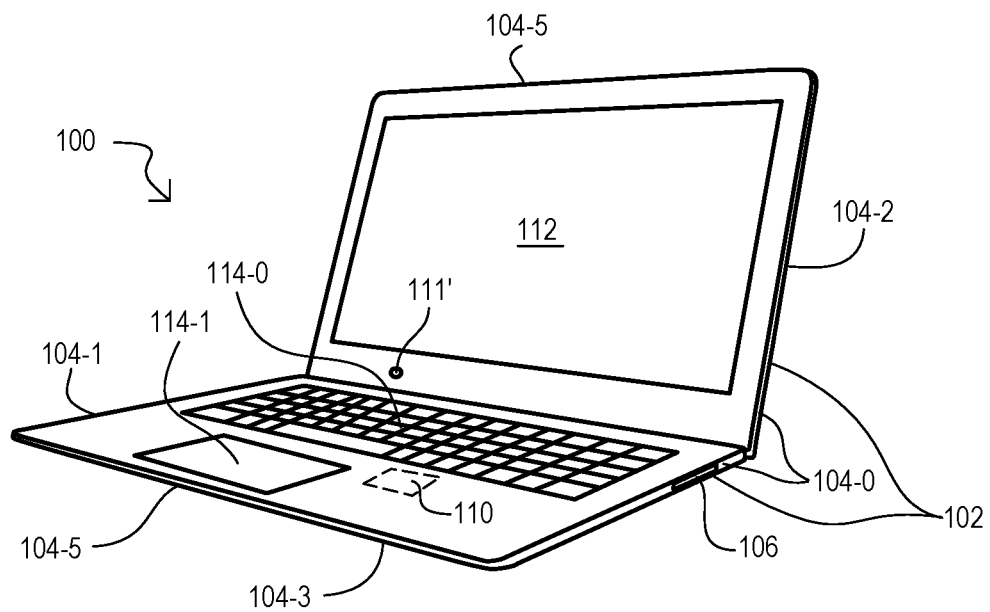

FIGS. 1A and 1B are perspective views of a portable electronic device 100 according an embodiment. The device 100 can have two or more physical configurations. FIG. 1A shows device 100 in a first physical configuration, which in the particular embodiment shown, can be a closed configuration. FIG. 1B shows device 100 in a second physical configuration, which in the particular embodiment shown, can be an open configuration.

Referring to FIG. 1A in conjunction with FIG. 1B, a device 100 can include a display 112, one or more user physical interfaces (two shown as 114-0/1), a biometric sensor 106, and a sense indicator 108. The display 112 can be of any suitable technology, including but not limited to: light emitting diode (LED), organic LED (OLED), liquid crystal display (LCD), quantum dot display, electroluminescent display, or electronic paper, as but a few examples. The display 112 may or may not include a user interface overlaid on the display 112, enabling user input via touches, gestures, or implements (e.g., stylus).

A user physical interface (e.g., 114-0/1) can enable a user to provide inputs to the device 100. The user physical interface can be any suitable interface, including but not limited to: buttons, sliders, thumb sticks, dials in both mechanical and non-mechanical form (i.e., capacitive sensing, resistive sensing, piezoelectric), as but a few examples. In the particular embodiment shown, user physical interface 114-0 can be a keyboard, while user physical interface 114-1 can be a touchpad. However, as noted above, such particular arrangements should not be construed as limiting. As but one example, a user physical interface may also include a touch sensor panel disposed on display 112.

A biometric sensor 106 can authenticate physical features of a user. In some embodiments, the biometric sensor 106 can sense a feature of a user's hand. In particular embodiments, the biometric sensor 106 can be a fingerprint reader. However, device 100 can include any other suitable biometric sensor, including a palm print reader, an eye scanner (including retinal, iris or sclera matching), or a facial recognition imager, as but a few of many possible examples.

Referring back to FIG. 1A, in a closed configuration, the device 100 can have a body with a number of outside surfaces (104-0 to 104-5). While FIG. 1A designates six outside surfaces, alternate embodiments can have a different number of outside surfaces. That is, the particular shape of device 100 should not be construed as limiting.

When a device 100 is in a closed configuration, the display 112 can be inaccessible by a user. In addition, in a closed configuration a user physical interface (114-0/1) can be inaccessible by a user. When closed, device 100 can present the outside surfaces (104-0 to 104-5). Biometric sensor 106 can be disposed on any of the outside surfaces (104-0 to 104-5). In the particular embodiment shown, biometric sensor 106 is located on outside surface 104-0, however locations on any other surface are contemplated. In this way, biometric sensor 106 is available for an authentication operation when the device 100 is in the closed configuration.

A sense indicator 108 can also be disposed on an outside surface (104-0 to 104-5). In the particular embodiment shown, sense indicator 108 is located on outside surface 104-2. However, sense indicator 108 can be located on any other outside surface. The sense indicator 108 can provide an indication for any or all of the following: a status of the device 100 (e.g., locked or unlocked), a status of a biometric authentication operation (e.g., not in progress, in progress), or a result of a biometric authentication operation (e.g., no match, match). In addition or alternatively, the sense indicator 108 can provide a status of operations being performed by a device 100. In some embodiments, the sense indicator 108 can provide a visual indication, such as light that can change appearance in response to different conditions (e.g., constantly shine, blink at one or more speeds, or change colors). However, in other embodiments, the sense indicator 108 can provide other types of indications including audible and tactile (e.g., vibration).

In some embodiments, the device 100 can also have microphone 111 disposed on an outer surface (104-0 to 104-5). In the particular embodiment shown, microphone 111 can be located on outer surface 104-2. However, microphone 111 can be located on any other outer surface. The microphone 111 can detect a user voice to enable voice access and commands for operating the device 100. While FIG. 1A shows microphone 111 on an outside surface, in other embodiments, a microphone can be located on a non-outside surface (i.e., a surface not user accessible when the device 100 is in the closed configuration). For example, FIG. 1B shows microphone 111' located below display 112. If microphone 111' can provide sufficient voice detection in the closed configuration, microphone 111' can be used to process voice commands once biometric authentication has been completed.

In particular embodiments, the device 100 can be a computing device that includes a main processor 110 located within the device. The main processor 110 can operate in conjunction with instructions and memory to execute various functions of the device 100. In one embodiment, device 100 can be a laptop computer, and main processor 110 can be the main CPU for the laptop computer.

According to some embodiments, biometric authentication by biometric sensor 106 can occur independently of main processor 110. That is, a biometric authentication operation can utilize processing circuits and storage circuits for authentication that are different than those of the main processor 110. Consequently, biometric authentication can occur regardless of the state of the main processor 110 (e.g., authentication can occur when the main processor is in a lower power state, such as a sleep or standby mode).

According to some embodiments, a device 100 can provide various functions. Some of the functions can be considered secure functions, as they may access or generate private data of a user. Biometric sensor 106 can be used to enable access to secure functions via voice command. However, other (e.g., not secure) functions, can be accessed via voice command without the use of biometric sensor 106. It is understood that the delineation between secure and not secure functions can be arbitrary and established by a user. In addition or alternatively, a device 100 may be able to categorize an application as being a secure application by self-identifying information provided by the application.

Figure 2A:
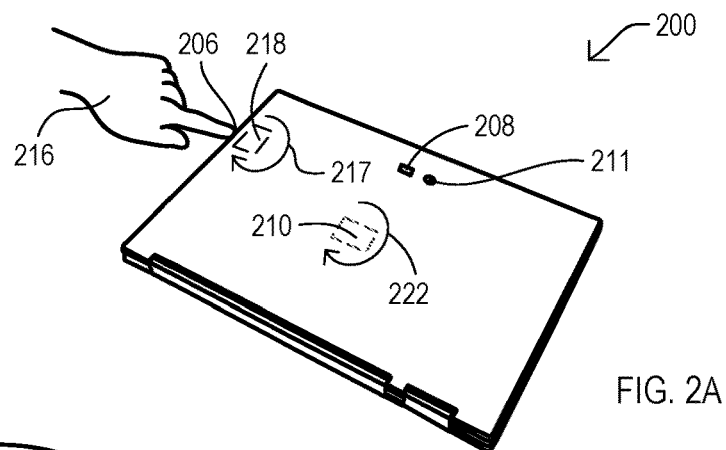
FIGS. 2A to 2C are a sequence of views showing operations of a portable electronic device according to embodiments of the present invention.
Figure 2B:
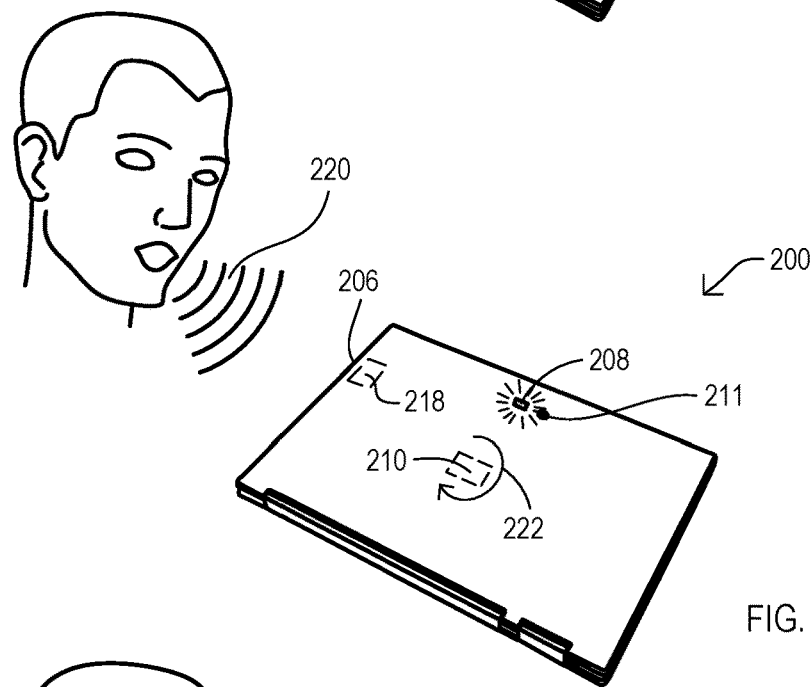
Figure 2C:
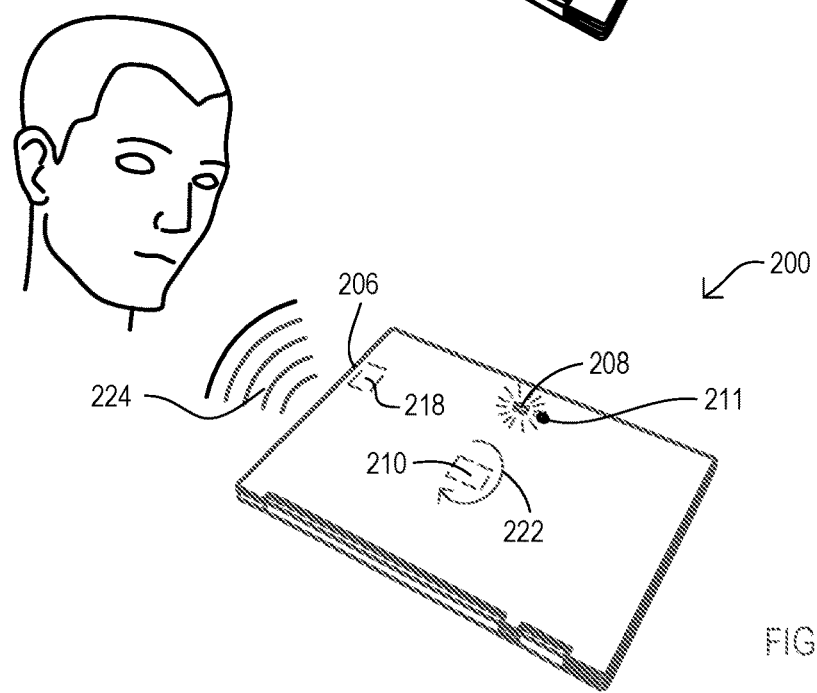

FIGS. 2A to 2C are a series of diagrams showing operations of a portable electronic device 200 according to an embodiment. Referring to FIG. 2A, a user may execute a biometric authentication operation 217 using a biometric sensor 206 to access predetermined functions (e.g., secure functions) while device 200 is in a closed configuration. A biometric authentication operation 217 can include biometric sensor 206 sensing one or more user body parts 216. In the particular embodiment shown, biometric sensor 206 can be a fingerprint sensor that senses one or more fingerprints of a user.

Referring still to FIG. 2A, biometric sensor 206 can be part of, or in communication with, a self-contained authentication system 218. Self-contained authentication system 218 does not require any other computing elements of the device 200 (such as a main processor 210) to perform an authentication operation. In particular embodiments, self-contained authentication system 218 can include a "Match on Chip Finger Print Reader" (MOC FPR) system. If self-contained authentication system 218 authenticates the user, predetermined functions within device 200 can be accessed, which can include a main processor 210 enabling a voice access 222 to predetermined functions of the device 200. It is understood that access to other functions (e.g., not the predetermined functions) can occur via voice access without authentication. In some embodiments, successful authentication can result in a device 200 transitioning from a low power consumption sleep state, to higher power consumption active state. However, in other embodiments, successful authentication can result in device 200 transitioning from a fully off state to an on state.

In some embodiments, any or all steps of an authentication process can be acknowledged by sense indicator 208, as noted herein, and equivalents.

Referring to FIG. 2B, following successful authentication with self-contained biometric authentication system, a user can provide a voice input 220 to the device 200. Voice input 220 can be detected by a microphone (e.g., 211). Voice input 220 can take any suitable form, and in particular embodiments, can include a voice assistant greeting for a voice assistant executed or accessed by the device 200.

Referring to FIG. 2C, in response to a detected voice input 220, a voice engine 222 can process a request. In some embodiments, the voice engine must recognize a user voice to process the request. In other embodiments, a voice engine can serve any detected voice that can be processed. Processing such a request can result in a voice engine output 224, which can take any suitable form, including an audio message for a user output by speakers (not shown) of the device 200. It is noted that an authenticated voice request can access predetermined functions that are not accessible via voice request alone, while other functions can be accessed via voice request without authentication.

In some embodiments, any or all steps of a voice request processing operation can be acknowledged by sense indicator 208, as noted herein, and equivalents. As but a few of many possible examples, a sense indicator 208 can indicate any of: a voice engine 222 is active or inactive, a voice engine 222 is about to be inactive after being active, a voice engine 222 is processing a request, or a voice engine 222 is not active as the user voice could not be authenticated.

Figure 3:
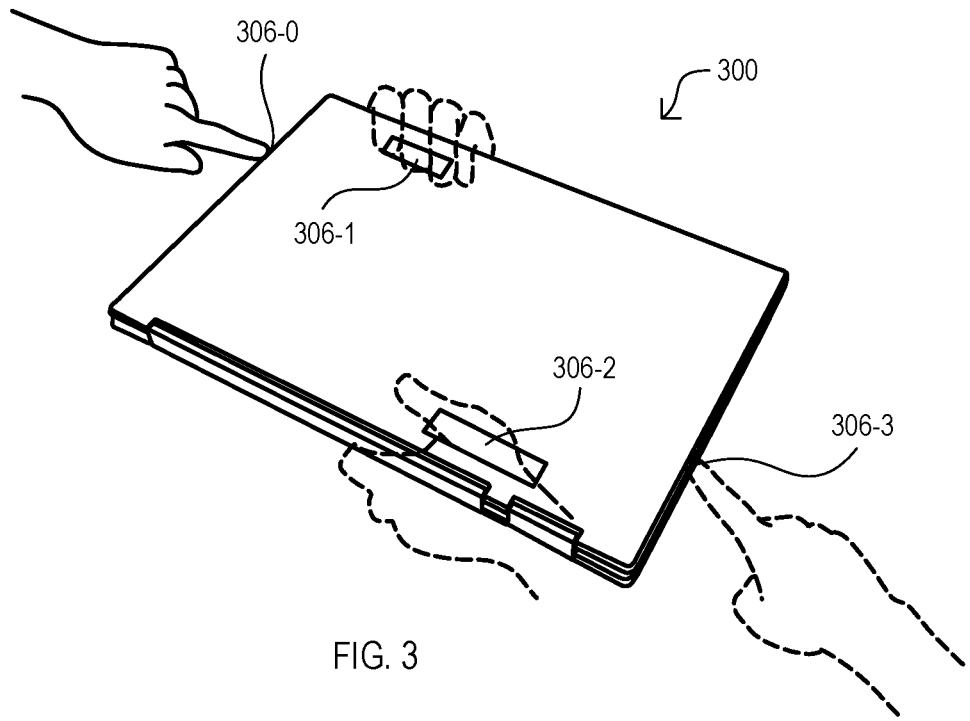
FIG. 3 is a perspective view of a portable electronic device according to another embodiment of the present invention.

While some embodiments have shown a biometric sensor located on a particular outside surface of a device, as noted herein, a biometric sensor can be situated at any suitable location on a surface of a device that is available when the device is in a closed physical configuration. FIG. 3 shows four of numerous possible locations and configurations for biometric sensors (306-0 to 306-3) on a surface of a device 300. While the biometric sensors (306-0 to 306-3) are shown to sense portions of a human hand, as noted herein, embodiments can include any suitable biometric sensor.

Figure 4:
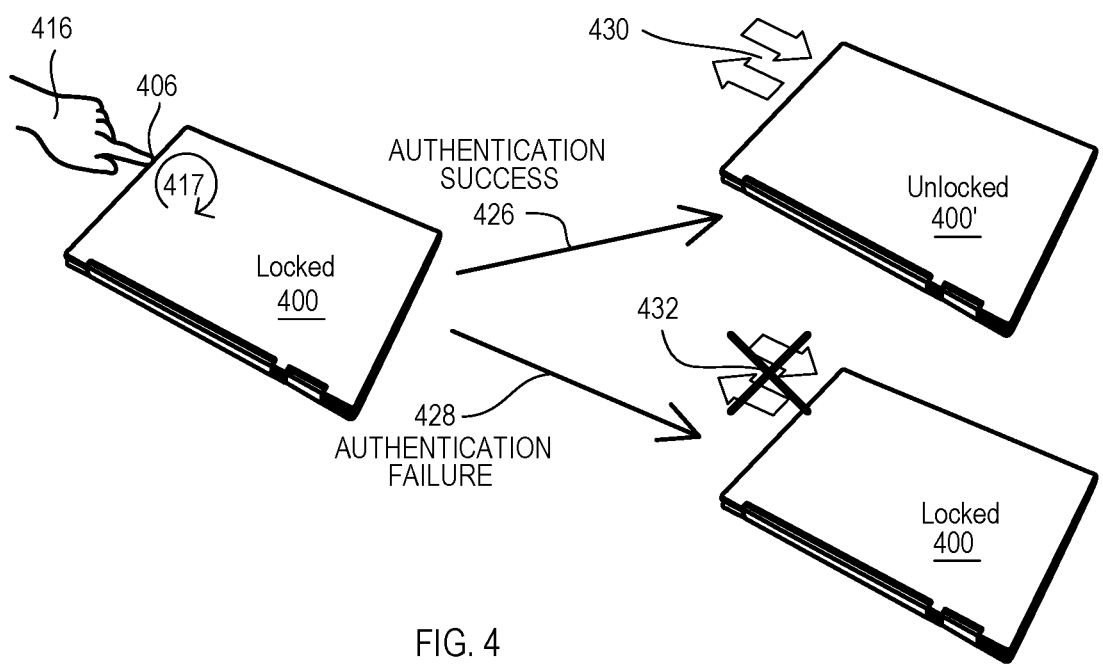
FIG. 4 is a diagram showing operations of a portable electronic device according to embodiments of the present invention.

FIG. 4 is a diagram showing a biometric authentication operation according to another embodiment. A portable electronic device 400 can be in a closed physical configuration, and in a locked state. In a locked state, some or all functions of device 400 are not accessible. For example, secure functions may not be accessible in a locked state. A user can perform a biometric authentication operation 417 using a biometric sensor 406 and self-contained authentication system, as described herein or equivalents. In the event such biometric authentication succeeds 426, a device can transition to an unlocked state 400'. In an unlocked state, user access 430 can occur, even though the device is in the closed physical configuration. For example, secure functions, not accessible without some authentication, can be accessible in the unlocked state. In contrast, in the event such biometric authentication fails 428, a device 400 can remain in a locked state, and a user may not have access to some or all of the device functions.

In particular embodiments, user access 430 can be via voice command that accesses a voice engine in the device. Further, activation using biometric sensor 406 can operate in a "push-to-talk" fashion, with an authenticated touch allowing access to voice enabled functions, such as a voice engine, with user voice commands. When the biometric sensor 406 is no longer being touched, voice access can be disabled, or disabled some predetermined delay after the biometric sensor 406 is no longer being touched. Alternatively, voice access can be disabled after a voice engine is finished processing a request. In some embodiments, certain requests (e.g., for secure functions) are only executable through authenticated voice access, while other requests (e.g., not secure functions) are executable through voice access without authentication.

Figure 5A:
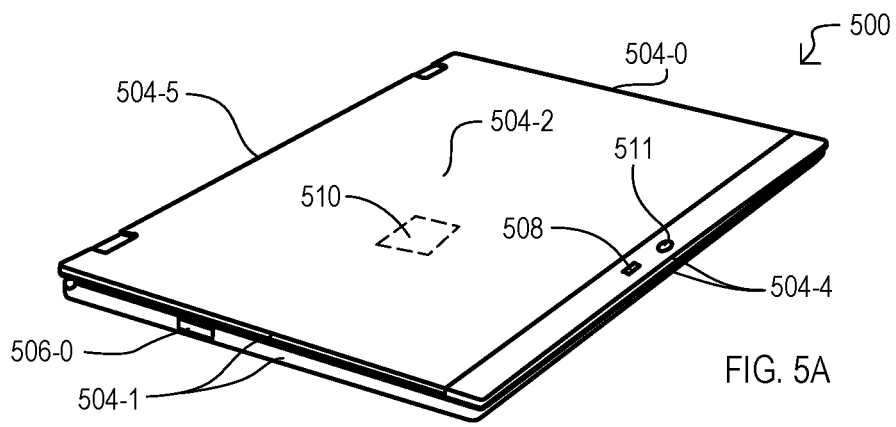
FIGS. 5A to 5C are a series of views of laptop computer configurations according to embodiments of the present invention.
Figure 5B:
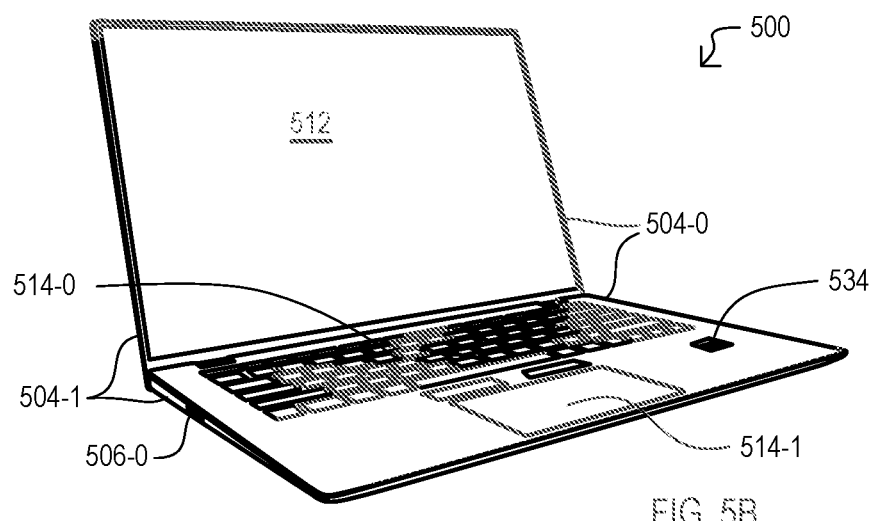
Figure 5C:
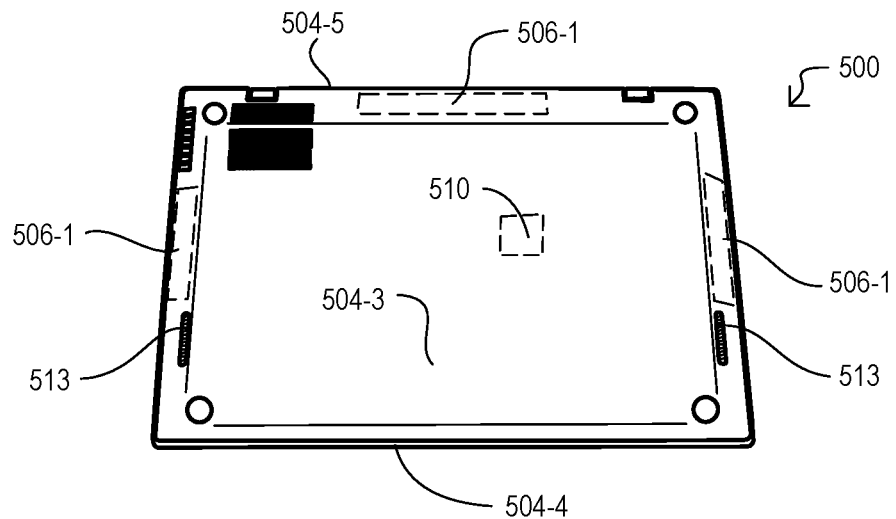

Referring now to FIGS. 5A to 5C, a portable electronic device 500 according to a further embodiment is shown in a series of views. In the embodiment shown, device 500 can be a laptop computer. Device 500 can include a main central processing unit (CPU) formed within its body for executing various functions.

FIG. 5A shows device 500 in a closed physical configuration. In the closed configuration, device 500 can present to the user outer surfaces, including a right side surface 504-0, a left side surface 504-1, a top surface 504-2, a bottom surface 504-3, a front surface 504-4, and a back surface 504-5. In the particular embodiment shown, a biometric sensor 506-0 is shown on a left side surface 504-1, and a sense indicator 508 and microphone 511 are shown on a top surface 504-2. However, such items can be situated on any of the other surfaces (504-0 to 504-5).

FIG. 5B shows device 500 in an open physical configuration. In the open configuration, a user may access a display 512, as well as a keyboard 514-0 and track pad 514-1. In the particular embodiment shown, device 500 can include another biometric sensor 534 that is accessible in the open configuration, but not accessible in the closed configuration. It is understood that an open configuration could include the display portion at various angles with respect to the keyboard portion, including arrangements that allow a 360 degree rotation of the display. In addition or alternatively, an open configuration can include a display portion being detached from a keyboard portion (e.g., tablet mode).

FIG. 5C shows a bottom view of device 500. FIG. 5C shows how biometric sensors 506-1 could be located on a bottom surface. Such particular locations are exemplary and should not be construed as limiting. In addition, FIG. 5C shows speakers 513, which can be used as outputs for a voice engine when the device 500 is in a closed physical configuration.

It is understood that while a laptop computer may benefit from the invention disclosed herein, the invention is not limited to any particular kind of device.

Figure 6:
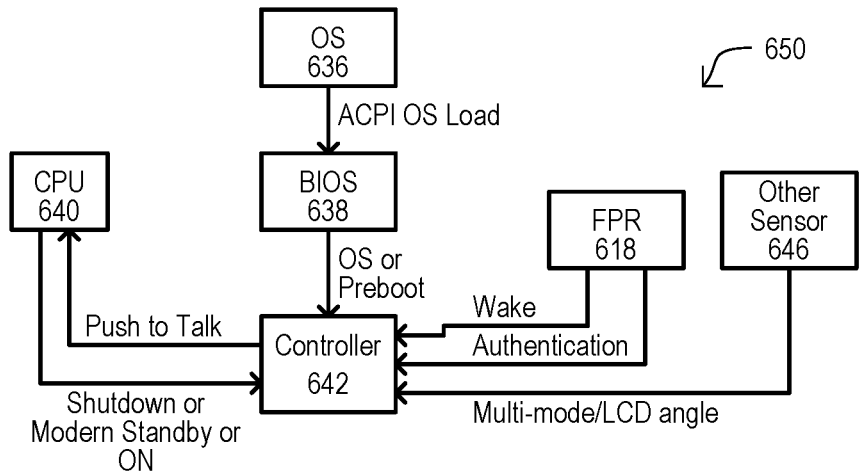
FIG. 6 is a control flow diagram of a portable electronic system according to an embodiment of the present invention.

FIG. 6 is a control flow diagram of a portable electronic device system 650 according to an embodiment. System 650 can include an operating system (OS) 636, a basic input/output system (BIOS) 638, a CPU 640, a controller 642, a biometric sense system 618, and one or more other sensors 646. An OS 636 can be loaded from a storage location to enable features of the device. While an OS 636 can be stored in any suitable location, in some embodiments OS 636 can be stored in nonvolatile memory on a device. An OS 636 can be loaded into volatile memory when the device powers up. Further, OS 636 can reside in volatile memory in a lower power state. However, in alternate embodiments, a system may utilize nonvolatile RAM and an OS 636 can remain resident in memory once loaded for a first time. An OS 636 can be loaded according to any technique, and in particular embodiments, can be a personal computer OS loaded according to the Advanced Configuration and Power Interface (ACPI) standard. BIOS 638 can control basic hardware functions of a system according to well-known techniques, including initiating boot sequences and enabling preboot authentication.

A CPU 640 can provide main processing functions for system 650. A CPU 640 can include a microprocessor having one or more processing cores. However, in alternate embodiments a CPU 640 can be a microcontroller or other type processor.

Controller 642 can execute various other tasks for a system 650, and in the particular embodiment shown, can place a system 650 into various states based on inputs, including turning the system 650 on or off, or transitioning a system from a standby (e.g., sleep) mode to an active mode. Controller 642 can also receive authentication results from biometric sense system 618. Further, controller 642 can receive inputs from various other sensors 646 of the system 650.

In the particular embodiment of FIG. 6, biometric sense system 618 can be a fingerprint reader (FPR). However, it is understood that biometric sense system 618 can take the form of any of those described herein, or equivalents. In some embodiments, biometric sense system 618 can be self-contained, and thus capable of executing a biometric authentication operation independent of any other system components. The biometric sense system 618 may always be on, and thus can be powered from standby power. Biometric sense system 618 can provide authentication results and other signals (e.g., Wake) to controller 642 in response to being activated. In one embodiment, upon sensing a finger, biometric sense system 618 can execute an authentication operation and send the results (e.g., pass/fail) to controller 642. In addition, biometric sense system 618 can send a Wake indication.

Other sensors 646 can provide information to controller 642 to indicate the physical state of the system 650. Such information can indicate if system 650 is in a physically closed configuration or a physically open configuration. In the particular embodiment shown, other sensors 646 can indicate an angle of a display (LCD), as well as whether the display is attached or not (e.g., tablet mode).

Having described various parts of a system 650, operations according to various embodiments will now be described.

Initially, a system 650 can be in a physically closed configuration, and in a standby or shutdown state. In response to user action, biometric sense system 618 can execute an authentication operation. In a particular embodiment, a user can bring a finger in contact with a biometric sensor to automatically start an authentication operation. In some embodiments, the authentication operation is self-contained in biometric sense system 618, and so does not involve operations by any other system components (e.g., only requires power). Biometric sense system 618 can generate outputs that vary according to an authentication result. If such outputs indicate an authentication failure, biometric sense system 618 can generate an authentication result (Authentication) indicating failure, and a wake result (Wake) indicating the same. In response to such outputs, controller 642 can maintain a system 650 in the standby or shutdown state. In some embodiments, a controller 642 can also generate a sense indication to let a user know that authentication has failed. Such a sense indication can take the form of any of those described herein, or equivalents, including a visual, audio and/or tactile indication.

If biometric sense system 618 indicates authentication success, the controller 642 can transition the system from a standby or shutdown state to an active (e.g., ON) state. In some embodiments, this can include waking and/or powering up CPU 640 from a shutdown or standby state. In addition, BIOS 638 can be signaled to initiate a boot procedure that will load OS 636. In some embodiments, this can include providing pre-boot authentication (Preboot)

based on authentication results from biometric sense system 618. In some embodiments, OS 636 can include a voice engine to enable voice access to the system 650 while it remains in a physically closed configuration. Successful authentication can also result in controller 640 activating a push-to-talk output to CPU 640. Such an output can enable a voice processing feature of CPU 640.

Figure 7:
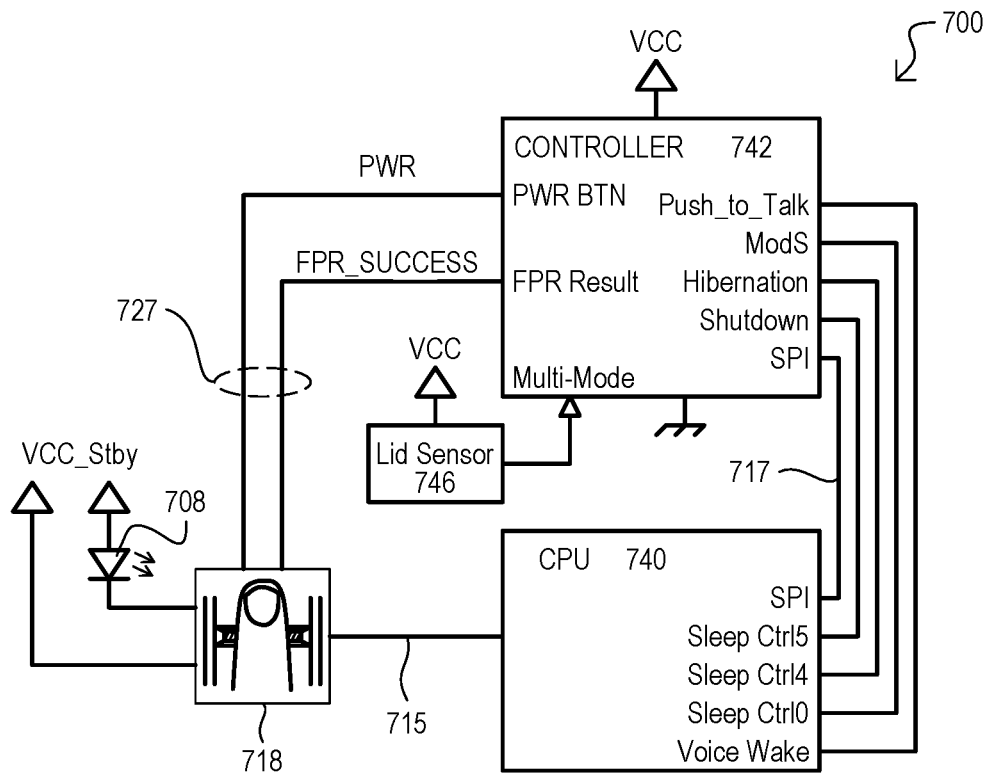
FIG. 7 is a block schematic diagram of a portable electronic device according to an embodiment of the present invention.

FIG. 7 is a block schematic diagram of a portable electronic device 700 according to an embodiment. Device 700 can include a controller 742, a CPU 740, biometric sense system 718, other sensor(s) 746, and a sense indicator 708. In some embodiments, the biometric sense system 718 can be a FPR. However, alternate embodiments can include any of the alternate biometric authentication approaches described herein or equivalents. Biometric sense system 718 can provide output signals to controller 742 and CPU 740. In the embodiment shown, biometric sense system 718 can include a data path 727 to controller 742. Data path 727 can provide a power output signal (PWR) and an authentication result signal (FPR_SUCCESS). In some embodiments, biometric sense system 718 can include an integrated power button that can be activated with a biometric authentication, or separately from any authentication. In other embodiments, biometric sense system 718 can serve as a power button. Authentication result signal FPR_SUCCESS can indicate if authentication is successful or not. Biometric authentication system 718 can be connected to CPU 740 by a data bus 715. Data bus 715 can be any suitable data bus. However, in particular embodiments, data bus 715 can be a high speed serial data bus, such as those according to a Universal Serial Bus (USB) or Serial Peripheral Interface (SPI) standard.

Other sensor(s) 746 can include one or more sensors that determine a physical configuration of device 700. In particular, other sensor(s) 746 can determine if device 700 is in a physically closed configuration or not. In some embodiments, other sensor(s) 746 can include a lid sensor that determines a position status of a lid of the device. In computing embodiments, a lid can be a portion of the device that includes a display. Thus, a lid sensor can indicate an angle of the display. In addition or alternatively, in computing embodiments a lid sensor can indicate if the lid has been removed from another portion of the device (e.g., display removed from keyboard section to operate as a tablet).

Controller 742 can place the device 700 in various states in response to received inputs. According to embodiments, if other sensor(s) 746 indicates device 700 is in a closed configuration, in response to an active PWR signal and successful FPR_SUCCESS signal from biometric sense system 718, controller 742 can activate a voice enabling output (Push_to_Talk). However, if FPR_SUCCESS indicates authentication failure, the voice enabling output can remain deactivated. Further, if other sensor 746 indicates device 700 is not in the closed physical configuration, controller 742 can output signals to take device 700 out of a low power state (e.g., hibernation or shutdown) into an active state (e.g., ON). In some embodiments, controller 742 can be one or more integrated circuits included in device 700. In particular embodiments, controller 742 can be an embedded controller that includes a microcontroller and ancillary circuits.

CPU 740 can receive various inputs from controller 742 and thus be placed in particular states. In some embodiments, a CPU 704 can be placed into a sleep (low power, standby) mode, or shutdown (no power) mode in response to inputs. In some embodiments, a CPU 704 can have more than one type of sleep mode. According to embodiments, in response to voice enabling output (Push_to_Talk) from controller 742, CPU 704 can transition from a sleep or shutdown state to an awake state, to thereby service a voice engine, and thereby enable voice access to functions of the device 700 by a user, even though the device is in a physically closed configuration. In FIG. 7, a CPU 740 can receive various other output signals (ModS, Hibernation, Shutdown) from controller 742 that can place CPU 704 into a particular state. In addition, CPU 740 and controller 742 can be in communication with one another over a data bus 717. In particular embodiments, data bus 717 can be a high speed serial data bus.

Sense indicator 708 can provide an indication to a user on a status of an authentication operation executed by biometric sense system 718. In the particular embodiment shown, sense indicator 708 can be an LED.

Referring still to FIG. 7, a biometric sense system 718 and sense indicator 708 can receive power from a standby power supply (VCC_Stby), which can be different from a standard power supply (VCC). The standby power supply can be present when a device 700 is in a physically closed configuration. In contrast, a standard power supply may not be available in the closed configuration or may be provided to only selected circuits.

Figure 8:
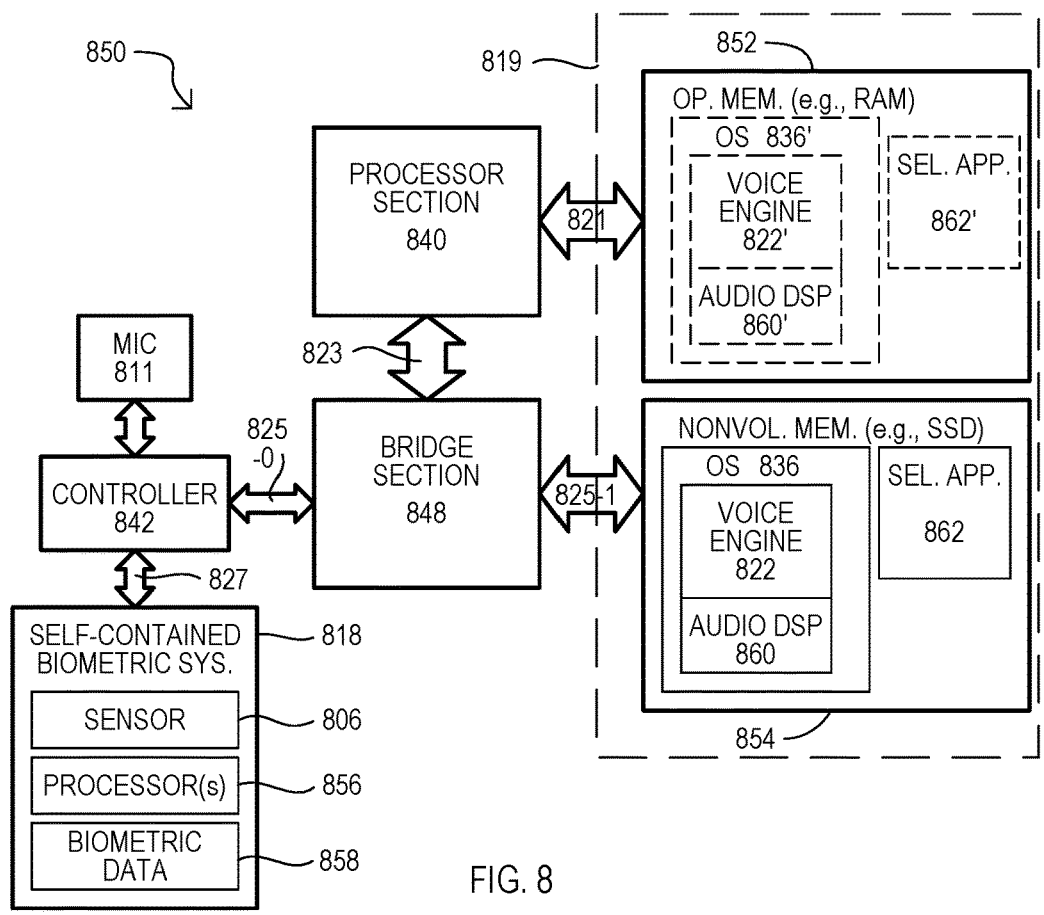
FIG. 8 is a block schematic diagram of a portable electronic system according to another embodiment of the present invention.

FIG. 8 is a block diagram of a system 850 according to an embodiment. A system 850 can include a processor section 840, memory section 819, bridge section 848, controller 842, a microphone 811, and biometric sense system 818. A processor section 840 can be connected to a memory section 819 by a memory bus 821 and to a bridge section 848 by a bridge bus 823. A processor section 840 can include processing circuits to execute various functions of a system 850. In particular embodiments, the processor section can include one or more microprocessors and include a memory controller.

A bridge section 848 can be in communication with controller 842 over a first system bus 825-0 and with memory section 819 over a second system bus 825-1. Bridge section 848 can provide communication paths between processor section 840 and both memory section 819 and controller 842.

A controller 842 can be connected to biometric sense system 818 over a data path 827. Controller 842 can take the form of any those disclosed herein, and equivalents, including an embedded controller.

Microphone 811 can detect sounds for a system 850, and can be monitored by controller 842, processor section 840, or both.

Biometric sense system 818 can be a self-contained system, and thus capable of executing an authentication operation without any other system components. In FIG. 8, biometric sense system 818 can include a biometric sensor 806, authentication processing circuits 856, and biometric data store 858. Biometric sensor 806 can take the form of any of those disclosed herein, or equivalents, including a FPR. Authentication processing circuits 856 can execute an authentication operation in response to data input from biometric sensor 806 and data stored in biometric data store 858. Accordingly, a biometric authentication operation can be performed in a self-contained fashion, and not utilize other system components, such as those of processor section 840.

A memory system 852 can include operating memory 852. Operating memory 852 can be in communication with processor section 840 over memory bus 821. Operating memory 852 can include an instance of a voice engine 822' and one or more applications 862'. Thus, processor section 840 can execute the voice engine in response to controller 842 indicating the system 850 is in a physically closed configuration and biometric authentication has been successful. In some embodiments, a voice engine 822' can be part of an OS 836' loaded in operating memory 852. Further, OS 836' can include an audio digital signal processor (DSP) 860' for processing voice inputs. However, in other embodiments, all or a portion of audio DSP can be performed by dedicated circuits (e.g., hardware). Application(s) 862' can be accessed by a voice engine 822'.

In some embodiments, operating memory 852 can be volatile memory. Accordingly, voice engine 822', application(s) 862', OS 836' or audio DSP 860' can be instances loaded from a nonvolatile memory 854. In such an arrangement, memory section 819 can include a nonvolatile memory 854 that can store a voice engine 822, application(s) 862, OS 836 or audio DSP 860 on storage media, for loading into operating memory 852.

According to embodiments, a system 850 can wake from a lower power mode according to various actions. The system 850 can awake from a low power mode in response to a successful authentication operation by biometric sense system 818. In addition or alternatively, a system 850 can awake from a low power mode by detecting voice commands, and authentication with biometric sense system 818 can enable access to some applications (e.g., secure applications) while access to other applications (e.g., not secure) can be by voice command without authentication.

Figure 9:
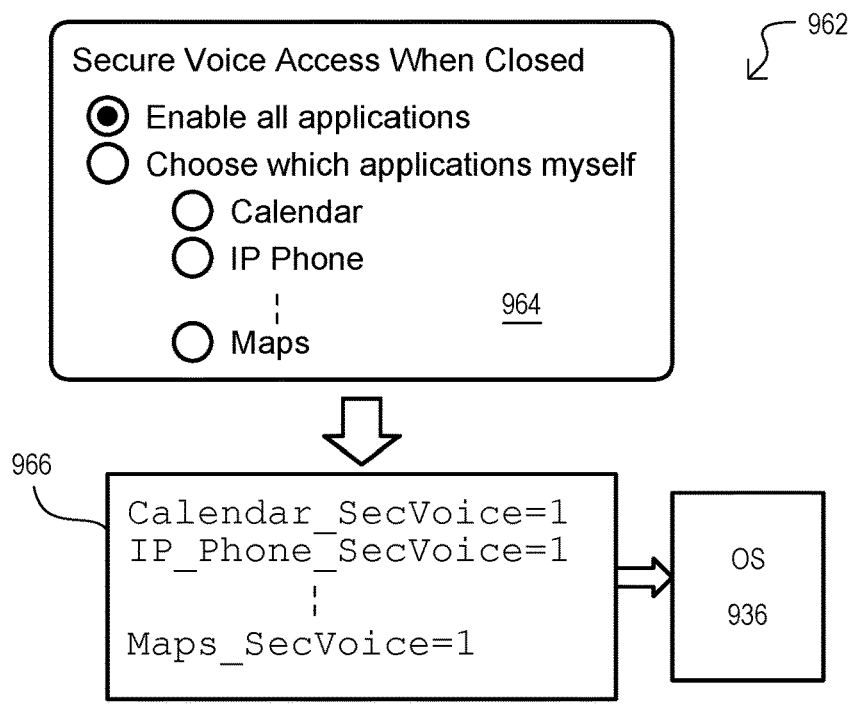
FIG. 9 is a diagram showing operations of a portable electronic device according to an embodiment of the present invention.

FIG. 9 is a diagram showing operations of a portable electronic device according to embodiments. FIG. 9 shows a function selection operation 962 in which a user can select which applications can be accessed via biometric authentication when the device is in a physically closed state. Through an application user interface 964, a user can select which (or all) functions that can be accessed. In response to user selections, application selection data 966 can be stored in the device. The device can then use application selection data to determine which applications or functions can be enabled via biometrically authenticated voice command. In some embodiments, an OS 936 can access application selection data 966 to enable or disable such access to particular applications and/or functions.

Having described devices, systems and corresponding methods according to various embodiments, additional embodiments will now be described with reference to flow diagrams.

Figure 10A:
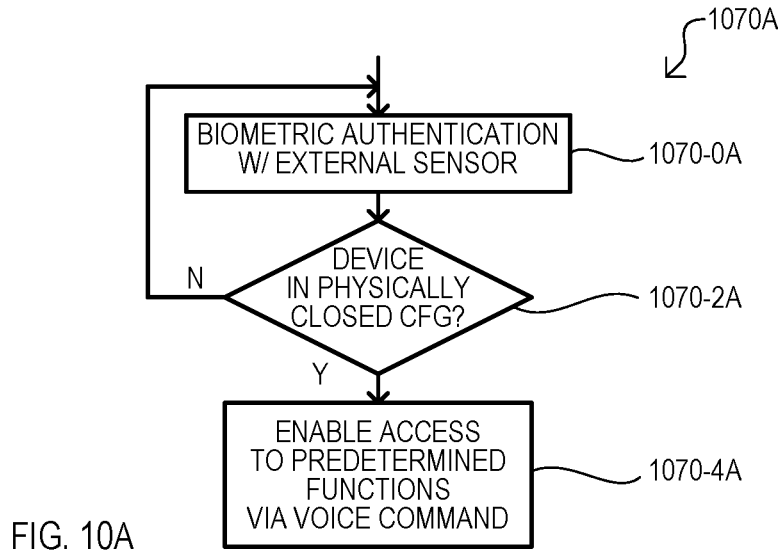
FIG. 10A is a flowchart of an exemplary method for providing secure voice access to a portable electronic device according to an embodiment of the present invention.

FIG. 10A is a flow diagram of a method 1070A according to one embodiment. Method 1070A can include a biometric authentication with a sensor on an external surface of a device 1070-0A. Such an action can include a user applying and/or presenting one or more body parts to a biometric sensor of the device. Biometric sensing can occur according to any of the techniques described herein and equivalents. Method 1070A can determine if the device is in a physically closed configuration 1070-2A. In some embodiments, such an action can include circuits on a device receiving values from one or more device sensors that indicate the physical configuration of the device. If the device is not in a physically closed configuration (N from 1070-2A), method 1070A can return to 1070-0A. If the device is in a physically closed configuration (Y from 1070-2A), method 1070A can enable access to predetermined functions of the device via voice command from a user 1070-4A. Such an action can include voice sensing and processing circuits being enabled, and then detecting and processing a user voice to determine a requested function. Such a function can then be executed for the user. Predetermined functions can be any suitable function provided by the device, and in particular embodiments can include functions that access or generate private data of a user. In some embodiments, such predetermined functions can include calendar applications, communication applications (e.g., VoIP or similar applications, texting, email, or other messaging), purchasing applications, banking or other finance related applications, as but a few of many possible examples.

Figure 10B:
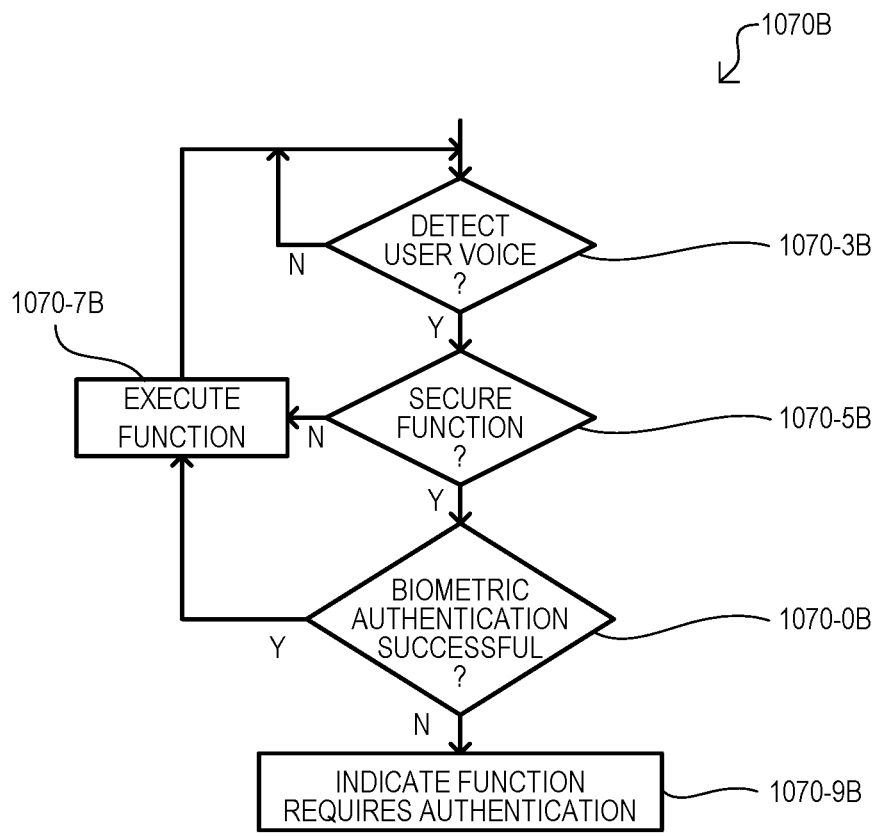
FIG. 10B is a flow chart of an exemplary method for providing access to secure functions of a portable electronic device according to an embodiment of the present invention.

FIG. 10B is a flow diagram of a method 1070B according to another embodiment. Method 1070B can include detecting a user voice 1070-3B. Such an action can include detecting the voice of a user of a portable electronic device with a microphone of the device. In some embodiments, this can include a voice engine of the device processing audio input data generated from the user voice. In some embodiments, action 1070-3B can include voice authentication, and voices that do not match predetermined voices will not be processed. However, in other embodiments no voice authentication may occur. A method 1070B can then determine if a user voice is requesting a secure function of the device 1070-5B. Such an action can include a device determining which function is being requested from the user voice. Once the function is detected, the device can compare the function to a list of functions known to be secure, receive a secure indication upon calling the function, detect data associated with the function that indicates it is secure, or any other suitable operation. If the function is not a secure function (N from 1070-5B), a method can execute the function 1070-7B without a need for authentication.

If the function is a secure function (Y from 1070-5B), a method 1070B can determine if a biometric authentication operation has been successful 1070-0B. Such an action can include any of the biometric authentication approaches described herein, or equivalents. If biometric authentication is successful (Y from 1070-0B), a method 1070B can execute the (secure) function (1070-7B). However, if biometric authentication is not successful (N from 1070-0B), a method 1070B can indicate that the requested function requires authentication (1070-9B).

Figure 11:
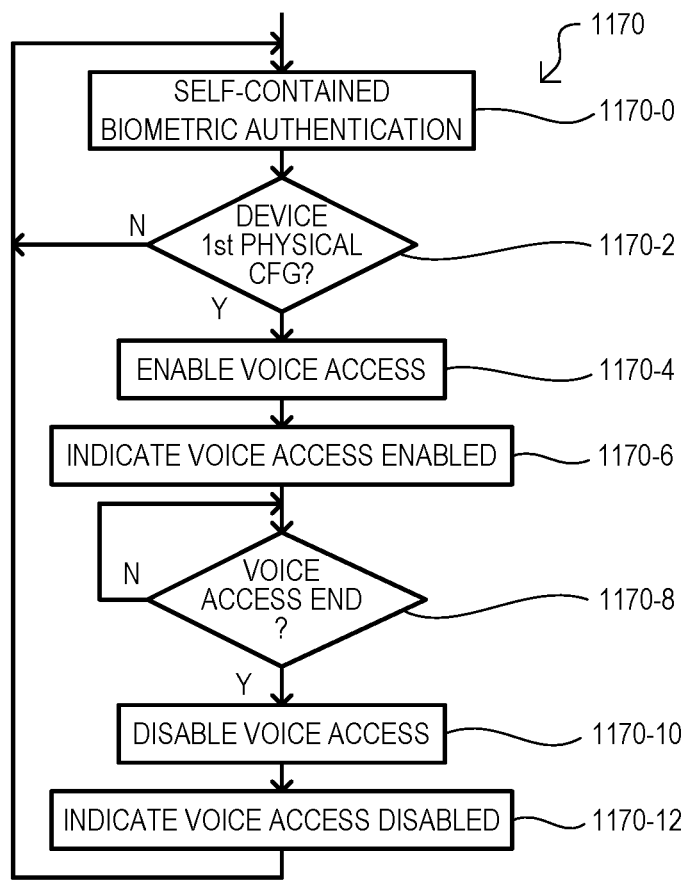
FIG. 11 is a flowchart of another exemplary method for providing secure voice access to a portable electronic device according to an embodiment of the present invention.

FIG. 11 is a flow diagram of a method 1170 according to another embodiment. Method 1170 can include a self-contained biometric authentication operation 1170-0. Such an action can include circuits executing the biometric authorization with local resources, and without other circuits of the device, such as a main processor. In some embodiments, a majority of the functions of a device can be provided using a main processor, and the biometric authorization operation 1170-0 is executed independent of such a main processor. Biometric sensing can occur according to any of the techniques described herein and equivalents.

Method 1170 can determine if a device is in a closed configuration 1170-2. Such an action can include any of those described for 1070-2 of FIG. 10, or equivalents. If the device is not in a physically closed configuration (N from 1170-2), method 1170 can return to 1170-0. If the device is in a physically closed configuration (Y from 1170-2), method 1170 can enable voice access to the device 1170-4. Such an action can include enabling voice access functions of the device. In some embodiments, such voice access functions can include voice authentication, preventing access to functions if a detected voice does not match an authorized user voice. In other embodiments, there can be no voice authentication.

Method 1170 can also include providing an indication to a user 1170-6. Such an indication can be for any operation of a biometric authentication and voice access operation, including but not limited to: biometric authentication positive, voice access has been enabled, or voice access in progress. An indication can take the form of any of the sense indicators described herein, or equivalents, including visual, audio and/or tactile indications.

Method 1170 can monitor if voice access operations have ended 1170-8. If voice access operations have not ended (N from 1170-8), method 1170 can continue to monitor voice access operations. If voice access operations have ended (Y from 1170-8), method 1170 can disable voice access 117-10. Such actions can include a device preventing voice access in the physically closed state until another successful biometric authentication operation is performed. Method 1170 can then provide an indication that voice access has ended 1170-12. In some embodiments, this can involve the same sense indicator(s) involved in 1170-6. However, in other embodiments, 1170-12 can involve a different sense indicator than that of 1170-6. A method 1170 can then return to 1170-0.

Figure 12:
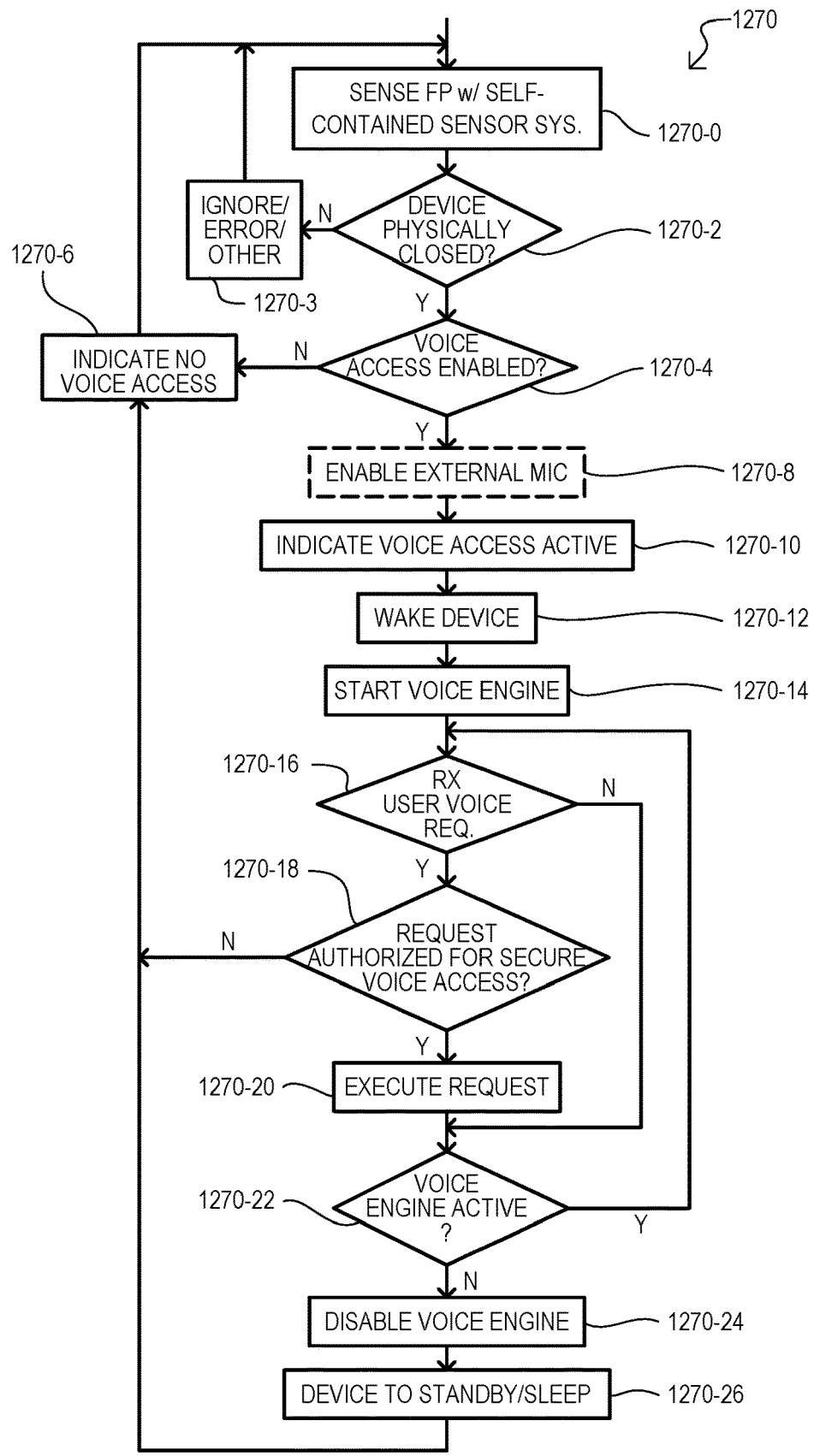
FIG. 12 is a flowchart of a further exemplary method for providing secure voice access to a portable electronic device according to an embodiment of the present invention.

FIG. 12 is a flow diagram of a method 1270 according to another embodiment. Method 1270 can include sensing a fingerprint with a self-contained sensor system 1270-0. In some embodiments, such an action can include authenticating a user fingerprint with a MOC FPR system.

Method 1270 can determine if a device is in a closed configuration 1270-2. Such an action can include any of those described for 1070-2 of FIG. 10, or equivalents. If a device is not in a closed configuration (N from 1270-2) a device can perform any of a number of actions 1270-3. Such actions 1270-3 can include, but are not limited to, ignoring the finger print sensing operation, providing an error indication, or some other action. Method 1270 can then return to 1270-0.

If a device is in a closed configuration (Y from 1270-2) a device can determine if voice access capabilities for the device have been enabled 1270-4. In some embodiments, such an action can include a device accessing configuration settings established at a prior time. If voice access is not enabled (N from 1270-4), the device can indicate so 1270-6. Such an action can include providing an indication with a sense indicator as described herein or equivalents. If voice access is enabled (Y from 1270-4), the device can indicate so 1270-10. Such an action can include providing an indication with a sense indicator as described herein or equivalents. Optionally, method 1270 can also include enabling an external microphone 1270-8. An external microphone can be a microphone having a sound sensing surface disposed on an outside surface of the device when the device is in the physically closed configuration.

Method 1270 can further include waking the device 1270-12. Such an action can include transitioning a device from a lower power consuming state, to an active, higher power consuming state. In some embodiments, a device may not be capable of processing voice requests in a low power state. In particular computing embodiments, 1270-12 can include a BIOS loading an OS or other software that can service voice commands.

Method 1270 can start a voice engine 1270-14. Such an action can include enabling (if not already enabled) one or more microphones on the device to capture voice requests from a user. A process can then be started on the device that can process capture voice requests from a user. It is understood that a voice engine can operate in conjunction with servers remote from the device over a network connection. In addition or alternatively, a voice engine can process voice request with processors local to the device. In some embodiments, a voice engine utilizes the processing capabilities of a main processor, and the main processor is not used for biometric authentication.

Method 1270 can determine if a user voice request has been received 1270-16. Such an action can include a voice engine processing sounds capture by a microphone that exceed a predetermined threshold level. If a voice request is determined to have been received (Y from 1270-16), a device can determine if the type of request is one that can be serviced 1270-18. Such an action can include checking configuration information stored on the device. Such information can specify whether the requested action and/or data associated with the requested action has been authorized for voice access. If the voice request is not authorized (N from 1270-18), method 1270 can proceed to 1270-6 (indicate no voice access). If the voice access is authorized (Y from 1270-18) a device can execute the request 1270-20. Such an action can include providing an output resulting from the request, including but not limited to, an audio output for the user. After a request has been executed, a device can monitor a voice engine for activity 1270-22.

If a user voice request is not received (N from 1270-16), method 1270 can go to 1270-22 (monitor voice engine).

If the voice engine is active (Y from 1270-22) method can go to 1270-16 (check for user voice request). If the voice engine is no longer active (N from 1270-22), a device can disable a voice engine (1270-24). In some embodiments, a device can then go into a lower power mode (e.g., standby or sleep or even shutdown) 1270-26. Method can then go to 1270-6 (indicate no voice access).

After indicating no voice access (1270-6), method can return to 1270-0.

While embodiments having particular shapes and configurations have been described herein, such particular embodiments should not be construed as limiting. Non-limiting alternate embodiments will now be described with reference to FIGS. 13A to 15. Such embodiments can include any of the various features of other embodiments described herein. It is understood that these embodiments are exemplary only, with the claims defining the metes and bounds of the invention.

Figure 13A:
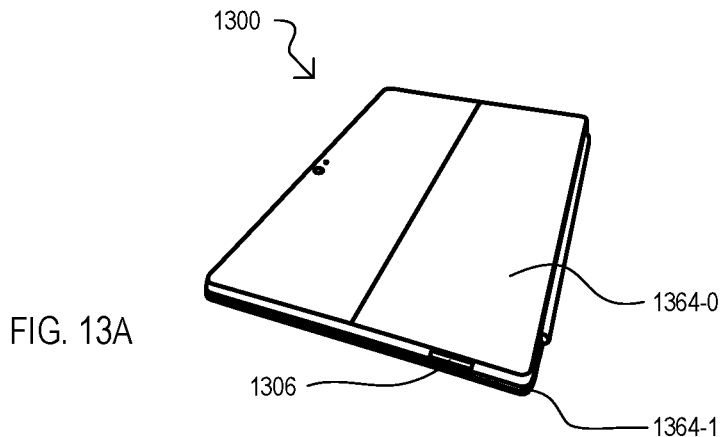
FIGS. 13A to 13C are a sequence of perspective views showing configurations of a portable electronic device according to a further embodiment of the present invention.
Figure 13B:
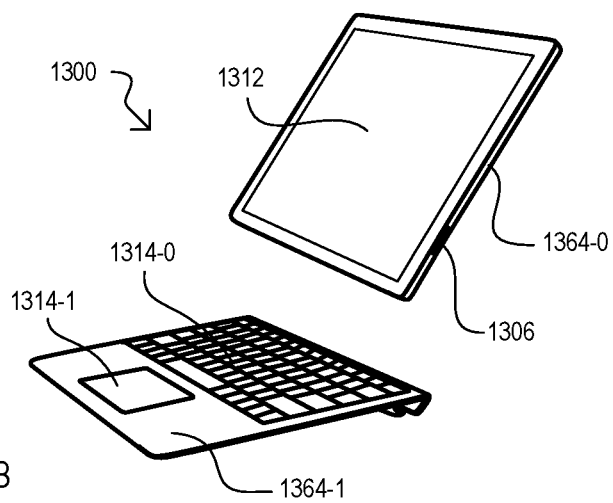
Figure 13C:
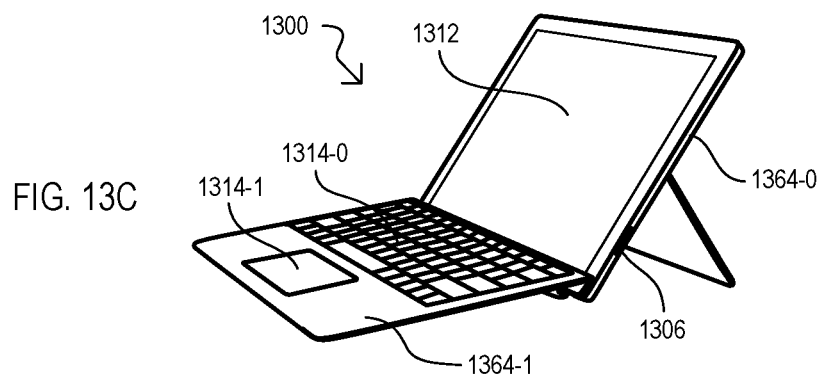

FIGS. 13A to 13C are sequence of perspective views of a portable electronic device 1300 according to an embodiment. Device 1300 can include a body that can be separated into more than one piece. In particular, device 1300 can include a first body piece 1364-0 and a second body piece 1364-1. A first body piece 1364-0 can include a display and biometric sensor 1306. A second body piece 1364-1 can include user physical interfaces 1314-0/1. In a physically closed configuration, first and second pieces 1364-0/1 can be joined in a predetermined manner. In non-closed configurations, first and second pieces 1364-0/1 can be joined in a different manner or can be separated from one another.

FIG. 13A shows device 1300 in a physically closed configuration. First and second body pieces 1364-0/1 are arranged to prevent access to display 1312 and user physical interfaces 1314-0/1. In such a configuration, biometric sensor 1306 is available. Voice access to the device 1300 in this closed configuration can be enabled according to any of the techniques described herein, or equivalents.

FIG. 13B shows device 1300 in a first, open configuration. First and second body pieces 1364-0/1 can be separated, and first body piece 1356-0 can execute functions independently of second body piece 1356-1. In some embodiments, biometric sensor 1306 can be disabled. However, in other embodiments, biometric sensor 1306 can serve to enable standard access of the device 1300. In some embodiments, display 1312 can also be a user physical interface, having a touch enable sensor formed thereon.

FIG. 13C shows a device 1300 in a second, open configuration. First and second pieces 1364-0/1 can be joined, but at a wider angle. In such a configuration, functions of device 1300 can be accessed via user physical interfaces 1314-0/1.

In a particular embodiment, a device 1300 can be a tablet type computing device with an attachable keyboard portion.

Figure 14A:
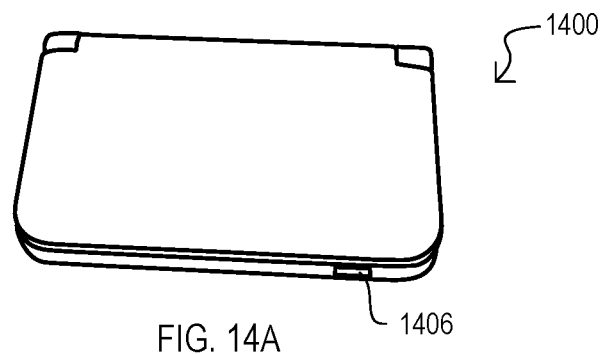
FIGS. 14A and 14B are perspective views showing configurations of another portable electronic device according to another embodiment of the present invention.
Figure 14B:
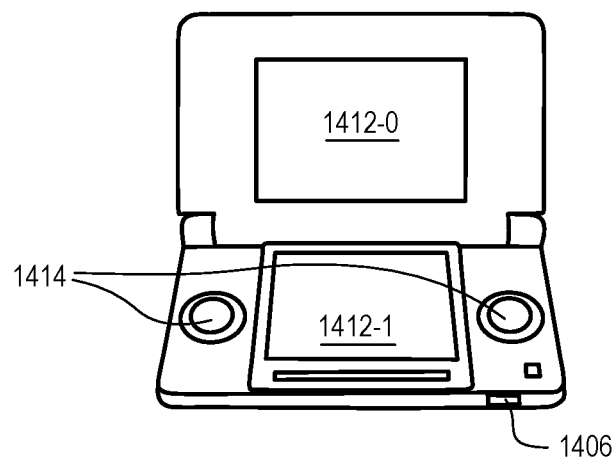

FIGS. 14A and 14B are views showing a portable electronic device 1400 according to another embodiment. Device 1400 can include two displays 1412-0/1 and user physical interface 1414 that are not user accessible in a closed configuration. FIG. 14A shows device 1400 in a physically closed configuration. A biometric sensor 1406 is user accessible. FIG. 14B shows device 1400 in an open configuration. Displays 1412-0/1 and user physical interface 1414 are accessible.

Figure 15:
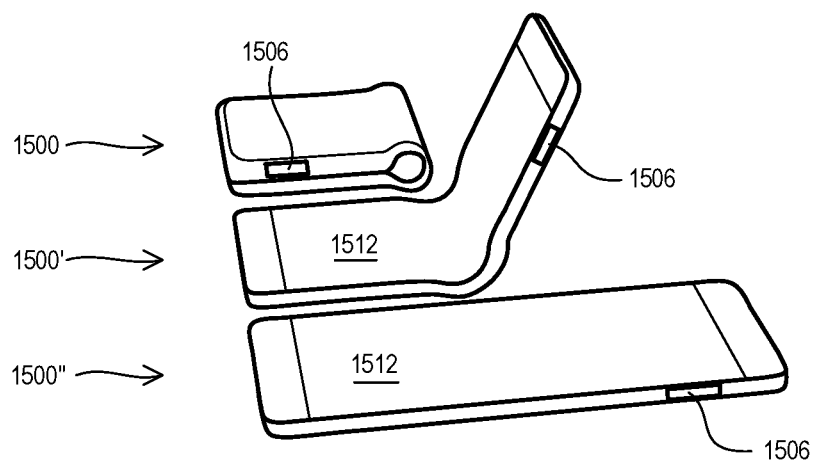
FIG. 15 shows a sequence of perspective views showing configurations of yet another portable electronic device according to another embodiment of the present invention.

FIG. 15 is a sequence of views of a portable electronic device 1500. Device 1500 can include a foldable display 1512. The sequence of views includes the device 1500 in a physically closed configuration, the device 1500' in an intermediate non-closed configuration, and the device 1500" in an open configuration. In the physically closed configuration 1500, display 1512 is not accessible, while biometric sensor 1506 is accessible.

It should be understood, of course, that the foregoing relates to exemplary embodiments of the invention and that modifications may be made without departing from the spirit and scope of the invention as set forth in the following claims.

The invention claimed is:

1. A portable electronic device, comprising:
   a display;
   a body having:
      a first physical configuration in which the display is not fully accessible by a user, and
      a second physical configuration in which the display is fully accessible by the user;
   an authentication system having a biometric sensor on an outer surface of the device that is user accessible in the first physical configuration;
   a voice engine enabled to access predetermined secure functions in response to a successful biometric authentication of the user by the authentication system and to access unsecure functions without biometric authentication; and
   a controller that monitors whether processing of a requested function by the user has finished;
   the controller, upon determining that processing of the requested function has finished, disables voice access to the voice engine and returns the device to a secured state;
   the disabling of voice access occurring in the absence of deactivation of a biometric sensor.

2. The device of claim 1, wherein:
   the device includes a main processing unit and main memory; and
   the authentication system is configured to execute a biometric authentication operation independent of the main processing unit and main memory.

3. The device of claim 2, wherein the authentication system further includes:
   a biometric data store configured to store biometric data, and
   an authentication processor configured to execute an authentication operation using biometric data of the biometric data store and sensor data generated by the biometric sensor.

4. The device of claim 1, wherein:
   the biometric sensor comprises a fingerprint sensor.

5. The device of claim 1, further including:
   a voice access indicator configured to inform the user that the voice engine has been enabled via biometric authentication.

6. The device of claim 1, further including:
   a voice access indicator comprising a light emitting device viewable by the user when the device is in the first physical configuration.

7. The device of claim 1, wherein the device is a portable computing device having:
   a first portion that includes the display: and
   a second portion that includes a keyboard or touchpad, and the keyboard or touchpad is not accessible when the device is in the first physical configuration and is accessible when the device is in the second physical configuration.

8. A portable electronic device, comprising:
   a body configurable into at least:
      a closed state in which a physical user interface is not accessible by a user, and
      an open state in which the physical user interface is accessible by the user;
   a main computing system having functions that can be unlocked in response to at least a biometric authentication operation; and
   a biometric authentication system having at least one biometric sensor accessible when the device is in at least the closed configuration;
   wherein the biometric authentication system is configured to execute the biometric authentication operation independent of the main computing system;
   a voice engine, for processing a requested function by the user, in communication with the biometric authentication system; and
   a controller that monitors whether processing of the requested function has finished;
   the controller, when processing of the requested function has finished, disables voice access to the voice engine and returns the device to a secured state;
   the disabling of voice access occurring in the absence of deactivation of a biometric sensor.

9. The device of claim 8, further including:
   a display that is not viewable by the user when the device is in the closed state, and viewable by the user when the device is in the open state.

10. The device of claim 8, wherein the biometric authentication system comprises a fingerprint matching system.

11. The device of claim 8, further including:
   a visual indicator, viewable by the user at least when the device is in the closed state, and configured to indicate when a function has been unlocked in response to the biometric authentication operation.

12. The device of claim 8, further including:
   a microphone configured to detect a user voice in at least the closed state; and
   a speaker configured to transmit sound in at least the closed state.

13. The device of claim 8, wherein:
   the physical user interface is selected from the group consisting of a keyboard and a touchpad.

14. The device of claim 8, wherein the main computing system includes:
an application executed by the computing system that enables the user to designate data or other applications accessible via the voice engine.

15. A computer implemented method having a processor and memory, comprising:
while a portable electronic device is closed to prevent access to a display of the portable electronic device by a user of the portable electronic device, authenticating the user with a biometric sensor disposed on an outer surface of the portable electronic device when closed;
enabling a voice engine to access at least one unsecure function of the portable electronic when closed but not access any secure functions; and
in response to a successful authentication of the user with the biometric sensor, enabling the voice engine to access at least one predetermined secure function of the portable electronic device when closed;
determining whether processing of a requested function by the user has finished;
upon determining that processing of the requested function has finished, disabling voice access to the voice engine and returning the device to a secured state;
the disabling of voice access occurring in the absence of deactivation of the biometric sensor.

16. The method of claim 15, wherein:
the biometric sensor is a fingerprint sensor; and
authenticating the user comprises matching a user fingerprint to biometric data stored local to the biometric sensor.

17. The method of claim 15, further including:
providing an indication, viewable when the portable electronic device is closed, that indicates when the voice engine is disabled and when the voice engine has been enabled with the biometric sensor.

18. The method of claim 15, wherein:
the portable electronic device is a computing device having a main processing section and a keyboard or touchpad that is not accessible by the user when the portable electronic device is closed; and
the authenticating of the user is performed by local biometric sensing circuits independent of the main processing section.

19. The method of claim 15, further including:
transitioning the portable electronic device from a first operating state to a second operating state in response to successful authentication by the user;
wherein the first operating state is a lower power consumption state than the second operating state.

* * * * *